US007127925B2

(12) United States Patent
Hellgren

(10) Patent No.: US 7,127,925 B2
(45) Date of Patent: Oct. 31, 2006

(54) DIAPHRAGM SUPPORT AND A METHOD FOR INITIAL SEALING IN A PRESSURE CELL

(75) Inventor: Keijo Hellgren, Västerås (SE)

(73) Assignee: Avure Technologies AB, Vasteras (SE)

( * ) Notice: Subject to any disclaimer, the term of this patent is extended or adjusted under 35 U.S.C. 154(b) by 244 days.

(21) Appl. No.: 10/415,309

(22) PCT Filed: Nov. 23, 2001

(86) PCT No.: PCT/SE01/02593

§ 371 (c)(1),
(2), (4) Date: Oct. 27, 2003

(87) PCT Pub. No.: WO02/43887

PCT Pub. Date: Jun. 6, 2002

(65) Prior Publication Data

US 2004/0055480 A1 Mar. 25, 2004

(30) Foreign Application Priority Data

Nov. 28, 2000 (SE) .................................... 0004371

(51) Int. Cl.
*B29C 17/04* (2006.01)
*B21D 22/12* (2006.01)

(52) U.S. Cl. .................... 72/63; 72/54; 72/60; 425/389

(58) Field of Classification Search .................... 72/54, 72/56, 60, 63, 709; 29/421.1
See application file for complete search history.

(56) References Cited

U.S. PATENT DOCUMENTS

| | | | | |
|---|---|---|---|---|
| 2,771,850 A | | 11/1956 | Wheelon | 113/44 |
| 3,033,143 A | | 5/1962 | Grankowski | 113/44 |
| 3,875,778 A | | 4/1975 | Hellgren | 72/63 |
| 4,080,139 A | | 3/1978 | Hellgren | 425/389 |
| 4,658,618 A | | 4/1987 | Hellgren | 72/63 |
| 4,676,086 A | * | 6/1987 | Hellgren | 72/63 |
| 4,693,103 A | * | 9/1987 | Hellgren | 72/63 |

FOREIGN PATENT DOCUMENTS

| | | |
|---|---|---|
| CH | 232717 | 9/1944 |
| SE | 368 173 | 6/1974 |
| SE | 404 140 | 9/1978 |
| SE | 446 611 | 9/1986 |

* cited by examiner

*Primary Examiner*—David B. Jones
(74) *Attorney, Agent, or Firm*—Harness, Dickey & Pierce, P.L.C.

(57) ABSTRACT

A press of pressure cell type, which comprises a press chamber in which a diaphragm device is arranged. The diaphragm device comprises a diaphragm which together with a press plate forms a pressure cell and is adapted to exert a forming pressure on a workpiece in the press chamber. The edge area of the diaphragm is placed in an annular diaphragm support. The press of pressure cell type also comprises actuating means which are adapted to actively exert a force on the diaphragm support in the direction of the press plate, the diaphragm support pressing the edge area of the diaphragm against the press plate so that an initial seal is provided between the diaphragm at its edge area and the press plate, which seal is built up when supplying pressure medium to the pressure cell by expansion of the diaphragm. The invention also relates to a diaphragm device, a method for applying a pressing power and a method for exchanging a diaphragm in a press of pressure cell type.

25 Claims, 5 Drawing Sheets

DIAPHRAGM SUPPORT AND A METHOD FOR INITIAL SEALING IN A PRESSURE CELL

FIELD OF THE INVENTION

The present invention relates to a press of pressure cell type, a diaphragm device in a press of pressure cell type, a method for applying a pressing power and a method for exchanging a diaphragm in a press of pressure cell type.

BACKGROUND ART

A press of pressure cell type generally comprises a force-absorbing press body which defines a press chamber. In the upper part of the press chamber, a press plate and a diaphragm of rubber or another resilient material are arranged, which together form a pressure cell. The pressure cell communicates with a source of pressure and expands when a pressure medium is supplied. In the lower part of the press chamber, a structural support or a tray is arranged, which comprises a bottom plate having a tray frame. The tray supports a forming tool, a workpiece, a mat of rubber or another resilient material, covering the forming tool and the workpiece.

Presses of pressure cell type are used, among other things, when forming sheet-shaped blanks, for example sheets of steel or aluminium, for short series products within the aircraft industry and the motor industry. The sheet is placed in the press in such a manner that one of its sides faces a forming tool. The resilient diaphragm is arranged on the other side of the sheet. A closed space between the diaphragm and the press plate located above the diaphragm constitutes the pressure cell and this space is filled during the forming process with a pressure medium. By pumping additional pressure medium into the pressure cell, the pressure is increased in the pressure cell and the resilient diaphragm is pressed during stretching against the sheet which, in its turn, is formed round or in the forming tool. When the sheet completely fits to the tool, the pressure in the pressure cell is released and the diaphragm is removed, after which the formed component can be taken out of the press.

Another field in which presses of pressure cell type are used is wood compaction when a workpiece of wood is exposed to high pressure, either in a forming tool or on its own. Reasons for compacting wood are, for example, that it is desirable to increase the hardness of the wood, decrease the moisture content or to obtain a phase in pressure impregnation.

A diaphragm which is used in presses of pressure cell type has a limited service length, which means that the diaphragm has to be exchanged at certain time intervals. The diaphragms are often difficult to remove and, therefore, the exchanging process is both laborious and time-consuming. One example which illustrates these disadvantages is obtained from SE 404 140 which relates to a press, a diaphragm being arranged round an attaching frame that is attached to an attaching means with the aid of a number of bolts. Those skilled in the art will realise that exchanging a diaphragm in such a construction is very complicated.

SUMMARY OF THE INVENTION

One object of the present invention is to avoid the disadvantages of prior-art technique by providing a press of pressure cell type which involves a simple arrangement of a diaphragm in a press of pressure cell type.

Another object of the invention is to provide a press of pressure cell type which is designed in such a manner that it is made easier to exchange or remove a diaphragm.

Yet another object of the invention is to provide a method for exchanging or removing a diaphragm in a press of pressure cell type, which method is relatively quick and easy.

These and other objects which will be made clear from the following description are achieved by means of a press of pressure cell type, a diaphragm device and methods, having the features as defined in the appended claims.

In the present application, terms describing position and direction, such as "over/upwards/above" and "under/downwards/below" are used. Here, these terms are defined with respect to the essential direction of the pressing, i.e. so that a press plate is located above a diaphragm which, in its turn, is located above a bottom plate. It should also be understood that vertically is defined as perpendicular to the press plate and horizontally as parallel to the press plate. The above-mentioned definitions have been indicated for the sake of clarity since the press of pressure cell type can be inclined in different manners, and therefore the relative directions can vary.

According to one aspect of the invention, a press of pressure cell type is provided. The press comprises a force-absorbing press body which encloses a press chamber. A diaphragm device is arranged in the press chamber. The diaphragm device comprises a diaphragm of resilient material, such as rubber, which together with a press plate forms a pressure cell and which is adapted to exert a forming pressure on a workpiece in the pressure chamber, and an annular diaphragm support in which the edge area of the diaphragm is placed.

In addition, the press comprises actuating means which are adapted to actively exert a force on the diaphragm support in the direction of the press plate, the diaphragm support pressing the edge area of the diaphragm against the press plate so that an initial seal is provided between the diaphragm at its edge area and the press plate, which seal is built up when supplying pressure medium to the pressure cell by the expansion of the diaphragm.

The invention is thus based on the understanding that a satisfactory seal between the diaphragm and the press plate can be obtained also without complicated supplementary means. Unlike prior-art technique, in which different types of attaching means at the diaphragm are used to ensure a satisfactory diaphragm function, the diaphragm device according to the present invention has no such means. The invention thus goes against prior-art technique since the fundamental inventive idea is that the diaphragm should be loosely mounted relative to the press plate.

According to another aspect of the invention, a diaphragm device is provided for use in a press of pressure cell type. The diaphragm device comprises a diaphragm and an annular diaphragm support which is arranged circumferentially and encloses the circumference of the diaphragm, the edge area of the diaphragm being placed in the diaphragm support. The circumferential, enclosing diaphragm support thus makes it possible to arrange a diaphragm loosely in the diaphragm support without any particular attachment.

Before the operation of the press of pressure cell type has started, the diaphragm thus suitably rests loosely in the diaphragm support. When the diaphragm support is affected by an upward force, the diaphragm is pressed against the press plate, whereby an initial seal is established between the diaphragm and the press plate. When the initial seal has been established, a pressure medium, such as oil, is fed into the pressure cell which thus expands as the diaphragm expands. This results in, on the one hand, a larger contact surface between the diaphragm and the press plate being obtained and, on the other, the diaphragm pressing against the diaphragm support, whereby this is lowered at a suitable pace. A smooth lowering can, for example, be effected by means of a type of spring construction, the diaphragm support being lowered as the pressure medium is fed to the pressure cell. When in operation, the diaphragm thus ensures an independent, active seal against both the diaphragm support and the press plate without necessitating the use of special attachment means.

According to the invention, the diaphragm device has an in the press chamber from which the actuating means are adapted to aim at moving the diaphragm support towards the press plate in order to provide the initial seal. The actuating means also serve to lower the diaphragm device to the insertion position if, for instance, the used diaphragm is to be replaced. The diaphragm and the diaphragm support can be moved to and from said insertion position as a unit. The diaphragm which rests in the diaphragm support thus accompanies the diaphragm support when this is lowered, removed, inserted or lifted. This means a great advantage when replacing the diaphragm and will be described in more detail below. The insertion position can be either just below the position of the diaphragm support in a pressing operation or further below, such as adjacent to the bottom plate. Preferably, the actuating means comprise a form of hydraulic device, such as hydraulic cylinders or hydraulic pistons. However, those skilled in the art will realise that also other devices are possible in order to achieve the corresponding effect.

In one embodiment, the actuating means may comprise a spring construction so that when a pressing process is completed and the pressure medium is passed or pumped out of the pressure cell, for example, through a valve, the structural support is made to yield upwards and press against the initial seal, which is maintained. Alternatively, the actuating means can function in such a manner that the diaphragm is released from the press plate and rests loosely against the diaphragm support, when the pressing process is completed.

According to an advantageous embodiment, the diaphragm support is in the form of a sheet, such as a lamina or plate, and has a central hole, prestressing means being arranged on the external edge surface of the diaphragm support, i.e. the surface which indicates the outer diameter of the diaphragm support. The prestressing means induce a compressing prestress which acts in the sheet plane of the diaphragm support. This is advantageous if, for reasons of handling and transport, a diaphragm support is chosen, which is relatively thin and made of a relatively light material. In spite of a typical working pressure of 1200 bar in the press, the prestressing means thus allow that a relatively thin diaphragm support is used, and also results in the service length of the diaphragm support being prolonged and its endurance limit increased.

Conveniently, the above-mentioned prestressing means comprise a prestressing element which is wound round the diaphragm support. The prestressing element is preferably band-shaped and has essentially the same width as the thickness of the diaphragm support. One example of a suitable prestressing element is a band of spring steel.

The diaphragm support in the diaphragm device according to the present invention is designed in a suitable manner, among other things, in order to facilitate the replacement of a diaphragm. The diaphragm support which is annular, preferably made in one piece, has an essentially L-shaped vertical cross-section. Consequently, the diaphragm support has an essentially vertical wall portion which is adapted to enclose the diaphragm, and a shelf portion which protrudes from the wall portion towards the "centre" of the diaphragm and on which the diaphragm is adapted to rest loosely before operation. Conveniently, the transitional surface between the two portions is bevelled or rounded in order to avoid unnecessary damage to the diaphragm due to wear. The shelf portion can be inclined downwards and inwards to the "centre" of the diaphragm. Such an inclination results in the diaphragm (which is located in the diaphragm support) being centred in an easy manner.

The L-shaped or boot-shaped cross-section is particularly advantageous since the diaphragm support easily allows the removal of an old diaphragm and the insertion of a new diaphragm. If the diaphragm support has been removed from the press, the used diaphragm is simply lifted out of the diaphragm support and a new diaphragm can be lowered into the same.

Beneath the diaphragm support, a structural support is suitably arranged in the press chamber. The structural support can be a tray, part of a tray, a toolholder or some other device. However, the structural support has many functions, i.e. to constitute a support or abutment against the diaphragm support and also provide for a certain degree of sealing in the press chamber. Moreover, the structural support may serve as a supplementary diaphragm support. When the actuating means affect the diaphragm support by a force directed towards the press plate in such a manner that said initial seal is established, a gap forms between the diaphragm support and the subjacent structural support. When the pressure cell is filled with pressure medium, such as oil, the diaphragm expands so that, on the one hand, it seals against the press plate and the diaphragm support and, on the other, exerts a downward pressing power on the diaphragm support. The diaphragm support is therefore pressed, by possibly controlling the actuating means, in the direction of the structural support so that the gap therebetween is eliminated, a seal between the volumes on the respective sides of the diaphragm being established by the diaphragm support, when increasing the pressure in the pressure cell, constituting a pressure-actuated sealing function since a differential pressure between said sides is formed.

Conveniently, the diaphragm is designed in such a manner that an external edge, i.e. a circumferential annular area, of the diaphragm is bent upwards and backwards so that an open space is formed between a diaphragm portion which is not bent upwards and backwards and said edge which is bent upwards and backwards. At least a portion of this edge is intended to abut against the press plate. Said edge being bent upwards and backwards suitably comprises a bead or a bulge which is annular and follows the annular shape of the edge. Thus, the bulge is located on the side which is the extension of the underside of the main part of the diaphragm. This bulge is intended to provide the above-mentioned initial seal as the diaphragm is pressed against the press plate by means of the diaphragm support.

According to one embodiment of the invention, separating means are arranged between said edge being bent upwards and backwards and the underlying diaphragm portion so that these portions are kept apart, the lower portion being allowed to expand towards an underlying workpiece whereas the upper portion (the edge which is bent upwards and backwards) seals against the press plate. Consequently, the diaphragm partly encloses the separating means. As will be realised, the purpose of the separating means is also to keep the diaphragm stretched. The separating means can, for instance, be made to comprise a plate which is parallel to the press plate and arranged between the upper and the lower diaphragm portion. The plate is provided with at least one opening intended for supplying a pressure medium to the pressure cell.

As mentioned above, a press of pressure cell type which has an advantageous design is included in a structural support which is arranged in the press chamber and comprises a tray with a plurality of lamellar means abutting against one another. A great advantage of such a plate construction is that it is easy to manufacture and transport. Instead of making a large and heavy tray, the construction is divided into several plates which each separately weigh less and, thus, are easier to handle.

The lowest lamellar means is loosely arranged on the bottom plate of the press chamber. This lamellar means and the plate-shaped annular lamellar means which are concentrically located thereabove define a press space, in which space a tool and a workpiece can be arranged. The uppermost lamellar means in the structural support thus exhibits a contact surface for the diaphragm support. The actual diaphragm support can be considered a lamellar means since the diaphragm support and the other lamellar means preferably are made of similar sheet-metal blanks. According to a preferred embodiment, the lamellar means (including the diaphragm support) are detachable from one another.

In an advantageous embodiment, also a second diaphragm support is provided, apart from the previously mentioned diaphragm support, such as the uppermost lamellar means. Preferably, this second diaphragm support is in the form of a lamellar means which is located directly below the first main diaphragm support and is bevelled and/or rounded in order to avoid sharp edges in contact with the diaphragm. The lower of these two diaphragm supports or lamellar means has advantageously a smaller inner diameter so that this lamellar means has an inner portion which constitutes an extension of the support which is formed by the protruding shelf portion of the upper lamellar means.

According to an advantageous embodiment, one or more of the lamellar means abutting against one another are integrated with prestressing means or limiting means for essentially permanent limiting of the expansion of these lamellar means. The prestressing means or limiting means induce a permanent, compressing prestress which acts in the plane of the lamellar means. Suitably, said limiting means comprise bands which are wound round the external edge surface of the lamellar means, which bands have a width that is essentially as large as the thickness of the respective lamellar means.

Due to the construction having prestressing means, no external force absorber is thus needed on the short sides of the press chamber. The press construction can therefore be made relatively open by the short sides of the press chamber being accessible for insertion and removal of the internal lamellar means. In the mounted press, part of the internal lamellar means can at the ends of the press protrude beyond the actual press body.

The internal lamellar means are advantageously loosely arranged on the bottom plate and on one another. However, some type of control element is arranged for ensuring correct positioning. Due to the fact that the internal structure comprises lamellar means which are arranged loosely on one another, it is possible to easily remove them separately or several at a time. The press of pressure cell type is conveniently made with such dimensions that at least one lamellar means (including the diaphragm support) is liftable for uncovering underlying lamellar means inside the press chamber, one or more of said underlying lamellar means being removable from the press chamber whereas the remaining lamellar means are left inside the press chamber.

Preferably, this divisible construction is arranged in the press chamber in such a manner that the diaphragm support can be lifted in the direction of the press plate. Actuating means, such as hydraulic pistons, are suitably adapted to lift the diaphragm support and possibly also lamellar means which are placed therebelow. In its upper portion, the inner diameter of the diaphragm support essentially corresponds to the circumference or diameter of the press plate, and due to this fact the diaphragm support can be made to enclose the press plate when lifted upwards. It is convenient that the diaphragm support is so high that it encloses the press plate also in a non-lifted state, thereby obtaining a satisfactory seal during pressing.

Great advantages are obtained thanks to the above-described embodiment with internal lamellar means arranged on one another, especially as regards manufacturing, handling, carriage and transport. Yet another advantage is that it impossible to easily attach the workpiece and/or the protective mat between two lamellar means.

According to yet another aspect of the invention, a method is provided for exchanging the diaphragm in a press of pressure cell type. The method comprises the steps of exposing the diaphragm support inside the press chamber in any direction, removing the diaphragm support with the diaphragm resting loosely therein from the press chamber with the purpose of allowing lifting out of the diaphragm and lowering of a second diaphragm to rest loosely in the diaphragm support, inserting a unit, which comprises said second loosely resting diaphragm and said diaphragm support or a second diaphragm support, in the press chamber, and arranging the unit at its intended location.

According to a preferred embodiment, the diaphragm support is exposed by removing the structural support located therebelow. For instance, this can be effected by first lifting up the diaphragm support so that a gap is formed in relation to the structural support, the friction therebetween being eliminated so that the structural support can easily be removed from the press. After exposing the diaphragm support it is preferably lowered onto a transporting device which is moved or rolled out of the press.

When the diaphragm support has been removed from the press, the diaphragm is easily accessible since it rests loosely therein without any attachments. The diaphragm is thus removed and a new one can be lowered into the diaphragm support which, subsequently, can be inserted into the press and lifted up to the intended position.

During the operation of a press plant it is time-saving to have, outside of the press, a second complete diaphragm device with a diaphragm support and a diaphragm ready to be inserted essentially at the same as the used diaphragm device is being removed.

According to an advantageous embodiment of the invention, the diaphragm support has an essentially oval shape or the shape of a running track, i.e. two parallel sides which at the respective ends change into convex semicircular sides in such a manner that a closed track is formed. Moreover, the diaphragm has suitably essentially a shape corresponding to the diaphragm support so that it easily can receive the diaphragm.

If lamellar means are used in the structural support located below the diaphragm support, these preferably have essentially the same outer diameter as the diaphragm support. The lamellar means are formed, for example, of hot-rolled steel plate having a thickness of about 80–150 mm, such as 100–120 mm, preferably by milling or cutting. It is possible to assemble the lamellar means from two or more parts, which subsequently by the turns of the band are connected to an integral unit. The thickness of the diaphragm support is about 80–150 mm, preferably about 100 mm, and the diaphragm support can also comprise several parts which are connected to an integral unit by means of the turns of the band.

It has also been found to be practical to manufacture the press body from force-absorbing lamellar means and therefore the main part of the press can be manufactured in the same manner and is easy to transport in parts which are then assembled at the location where the press is to be used.

DETAILED DESCRIPTION OF THE DRAWINGS

Figure 1:
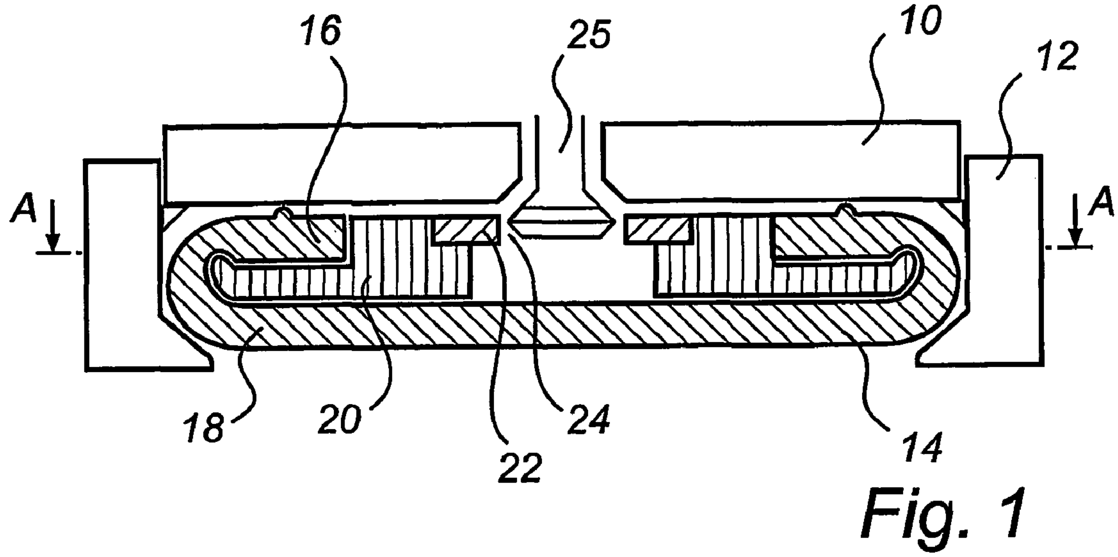
FIG. 1 is a schematic cross-sectional view of a pressure cell having a diaphragm device according to one embodiment of the invention.

FIG. 1 shows a vertical cross-section of a pressure cell which comprises a press plate 10 and a diaphragm device according to the invention. Thus, the diaphragm device comprises an external annular diaphragm support 12 of metal sheet, the diaphragm support enclosing a diaphragm 14 of a resilient material, preferably rubber. The external circumferential portion 16 of the diaphragm 14 is bent upwards and backwards so that a space is formed between this portion 16 and the diaphragm portion 18 which is located therebelow and is not bent upwards and backwards. The portion 16 which is bent upwards and backwards is intended to abut against the press plate 10 at least during operation. The diaphragm 14 is kept stretched by means of an annular frame 20 of steel which is arranged in a partly inserted position in said space between the portion 16 which is bent upwards and backwards and the diaphragm portion 18 which is located therebelow. The frame 20 which thus is enclosed by the diaphragm 14 is attached to and, in its turn, encloses an internal filling plate 22 which, among other things, ensures the stability in the construction. The filling plate 22 is provided with one or more apertures 24, through which pressure medium can be supplied to the pressure cell so that the diaphragm 14 expands. The supply of pressure medium is controlled by means of a valve device 25 which is arranged above the aperture 24.

Figure 2:
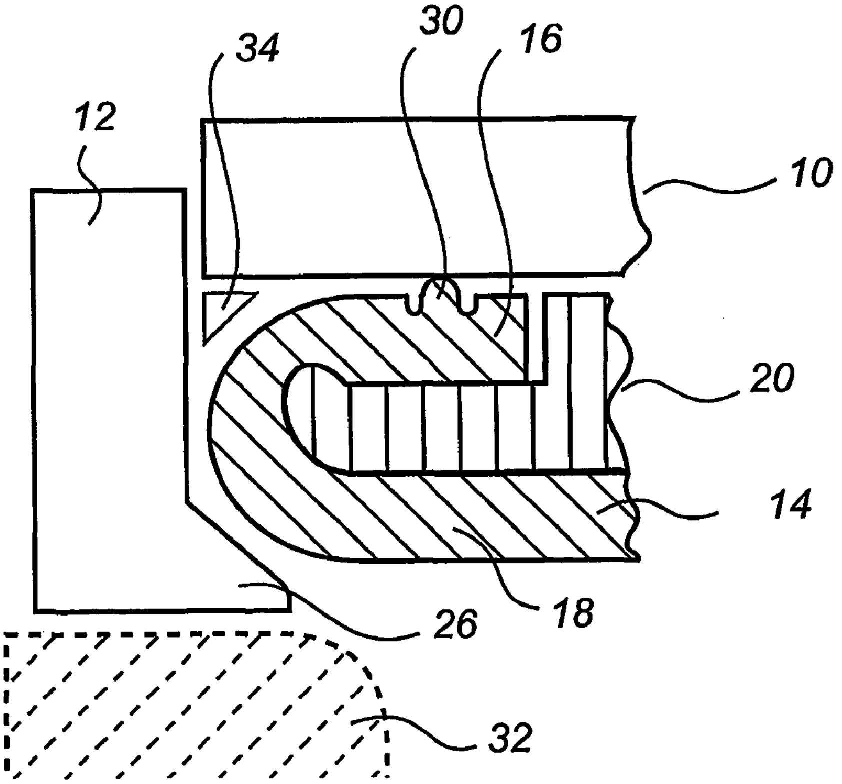
FIG. 2 is a schematic detailed view of the pressure cell in FIG. 1.

FIG. 2 shows part of FIG. 1 on a larger scale. The Figure shows that the diaphragm support 12 in this cross-section has essentially the shape of a boot, i.e. the inner surface of the wall of the diaphragm support 12 is bevelled so that a shelf portion 26 protrudes from its lower portion. The diaphragm support 12 can also illustratively be compared with a bowl having a large hole in the bottom. The diaphragm 14, in particular the diaphragm portion 18 which is not bent upwards and backwards, is intended to rest loosely on said shelf portion 26 when the pressure cell is not yet pressurised. The transition to the shelf portion 26 is rounded in order to avoid accidental damage to the diaphragm 14, which may arise if the edges are sharp. The internal edge of the shelf portion 26, which thus is located nearest the centre of the pressure cell, is also rounded.

The diaphragm portion 16 which is bent upwards and backwards is provided with a bulge 30 which has an initial sealing function against the press plate 10. The seal is provided by lifting the diaphragm support 12 upwards in the direction of the press plate 10, which results in the diaphragm 14, and in particular the bulge 30, resting in the diaphragm support 12 being pressed against the press plate 10 so that an initial seal is provided. The inner diameter of the upper portion of the diaphragm support 12 essentially corresponds to the circumference of the press plate 10, the upper portion of the diaphragm support 12 enclosing the press plate 10 and being allowed to be lifted and lowered.

When the initial seal has been provided, pressure medium can be supplied to the pressure cell, i.e. the space between the press plate 10 and the diaphragm 14 sealing thereto. Thus, when the pressure cell has been pressurised, the diaphragm 14 presses the diaphragm support down against a structural support 32 (indicated with dashed lines, not shown in FIG. 1) which is located below the diaphragm support 12, the upper part of the structural support having a rounded edge in order to avoid damage to the diaphragm when expanding. When increasing the pressure in the pressure cell, the diaphragm support 12 thus constitutes a pressure-actuated sealing function since a differential pressure between the volumes on the respective sides of the diaphragm 14 is formed. Sealing against the press plate 10 is maintained by the expansion of the diaphragm 14 during the pressurisation. The Figure also shows an O-ring gasket 34 which has a triangular cross-section, is arranged above the diaphragm and has a sealing purpose. The O-ring gasket is suitably made of rubber or metal, such as bronze. Preferably, the O-ring gasket 34 is even from the start arranged to abut against the diaphragm 14, but can alternatively be attached to the press plate 10 before the diaphragm 14 expands.

Figure 3:
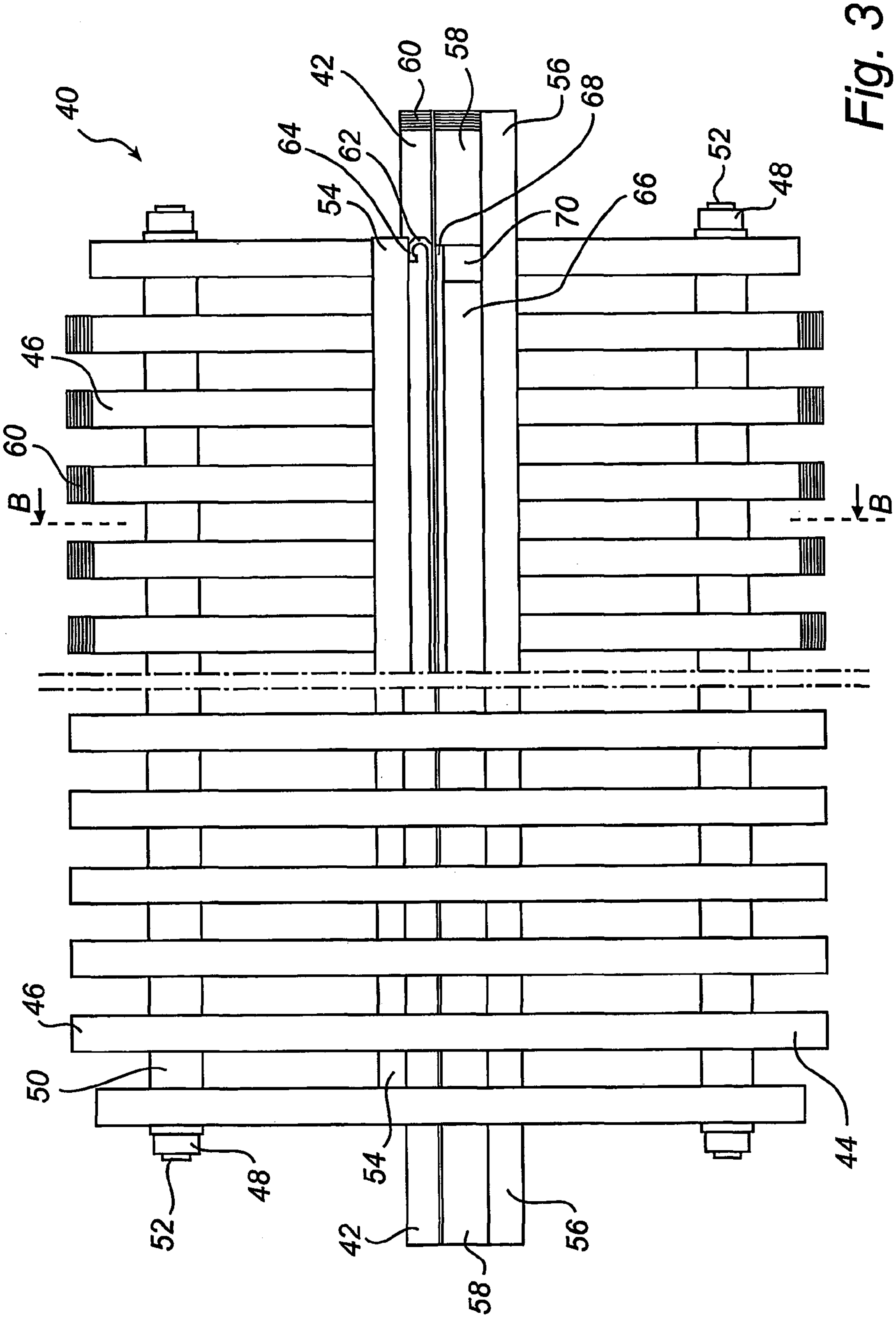
FIG. 3 is a schematic side view, partly in cross-section, of a press of pressure cell type according to one embodiment of the present invention.

FIG. 3 is a side view, partly in cross-section, of a press of pressure cell type 40 according to one embodiment of the present invention. Advantageously, the diaphragm support 42 is made and obtains its shape by milling or cutting of a blank, such as hot-rolled metal sheet. Also other parts which are included in the press can be manufactured in this way, which is rational and simplifies the manufacturing process significantly.

In the Figure, a central portion of the press of pressure cell type 40 is cut out, thus showing to the left of the central portion an ordinary side view of the press and to the right of the central portion a side view in cross-section of the press. Thus, to the left in the Figure the external edge surface 44 of external lamellar means 46 included in the press 40 is shown.

FIG. 3 thus shows a number of external vertically arranged lamellar means 46 which form a press body. These external lamellar means 46 are arranged next to one another in such a manner that the plane of the plate or main surface of each lamellar means 46 is parallel to the plate plane of the other lamellar means 46. The external lamellar means 46 are equidistantly spaced from one another and they are of essentially the same size and thickness.

Through circular apertures in all the lamellar means 46 included in the press body run coupling means 48 (two of which are shown), for example a steel rod having threaded ends. The lamellar means 46 are kept at a distance from one another by the fact that round each coupling means, between the lamellar means, there are distance means 50 having a thickness that is as large as the desired distance between the lamellar means. The distance means 50 are made of a relatively rigid material and their inner diameter is larger than that of the coupling means 48 at the same time as their external measures are essentially larger than the apertures arranged in the lamellar means 46. At the two external ends of the coupling means 48, outside the respective outermost lamellar means 46 included in the press body, there are stop devices. 52 of which at least one has a fixing and clamping mechanism which is complementary to the coupling means 48. In the case when the coupling means 48 comprises a rod being threaded at its ends, the fixing and clamping mechanism 52 can comprise a washer and a nut, the washer having external measures which are essentially larger than the coupling apertures of the outermost lamellar means 46. The four coupling means 48 are thus tightened to a predetermined prestress condition. This eliminates play and motion in the construction and at the same time contributes to the structural stability of the construction as regards flexural rigidity, torsional rigidity and resistance to extension in all dimensions.

The external lamellar means 46 in FIG. 3 are further provided with central holes (shown in FIG. 4) which are identical in all the lamellar means 46. The lamellar means 46 are positioned in such a manner that the central holes have a common centre axis, along which the serial holes or the internal edge surfaces of the lamellar means 46 together in the form of a lattice define a space for housing a press chamber. The direction of the main axis of the press chamber coincides with the centre axis of the central holes. An upper press plate 54 and a bottom plate 56 run through the central holes of the external lamellar means 46. Between the upper press plate and the bottom plate, the diaphragm support 42 and an internal lamellar means 58 are arranged abutting against one another, the internal lamellar means 58 being arranged on the bottom plate 56.

As already mentioned, the right part of FIG. 3 is a side view in cross-section of the press 40 of pressure cell type. The cross-section is made at the centre of the press 40, i.e. along the main axis of the press chamber. The right part of FIG. 3 shows that the lamellar means 46 which constitute the press body are wound with a band 60 on the respective external edge surfaces 44. Moreover, the Figure shows that also the diaphragm support 42 and the internal horizontal lamellar means 58 which abuts against the diaphragm support are wound with a band. This winding 60 of the diaphragm support 42 and the internal lamellar means 58 with a band is intended to essentially permanently limit expansion of them, i.e. they must be able to withstand the forces forming in the press chamber. The diaphragm support 42 and the internal lamellar means 58 are annular, which thus means that they define an internal, open space included in the press chamber. In the diaphragm support 42, a diaphragm 62 is placed. The diaphragm 62 has a seal 64 against the press plate 54 and forms a pressure cell therewith. During operation, a pressure medium is supplied to the pressure cell so that the diaphragm 62 expands. The open space 66 of the internal lamellar means 58 is intended to contain a tool. A metal sheet which is to be pressed against the tool is suitably arranged above the tool, the diaphragm 62, when being pressurised, expanding and being formed on the tool, which means that the metal sheet that is located therebetween is also formed on the tool. Besides, the Figure shows that a mat 68 is arranged just below the diaphragm 62. The mat 68 takes part in the forming of the metal sheet and at the same time protects the diaphragm 62 against wear. Adjacent to the inner wall of the lower internal lamellar means 58, a filling element 70 of rubber is arranged with the aim of distributing forces and of supporting the tool. If a piece of wood is to be compacted, this can be carried out without any tools.

Figure 4:
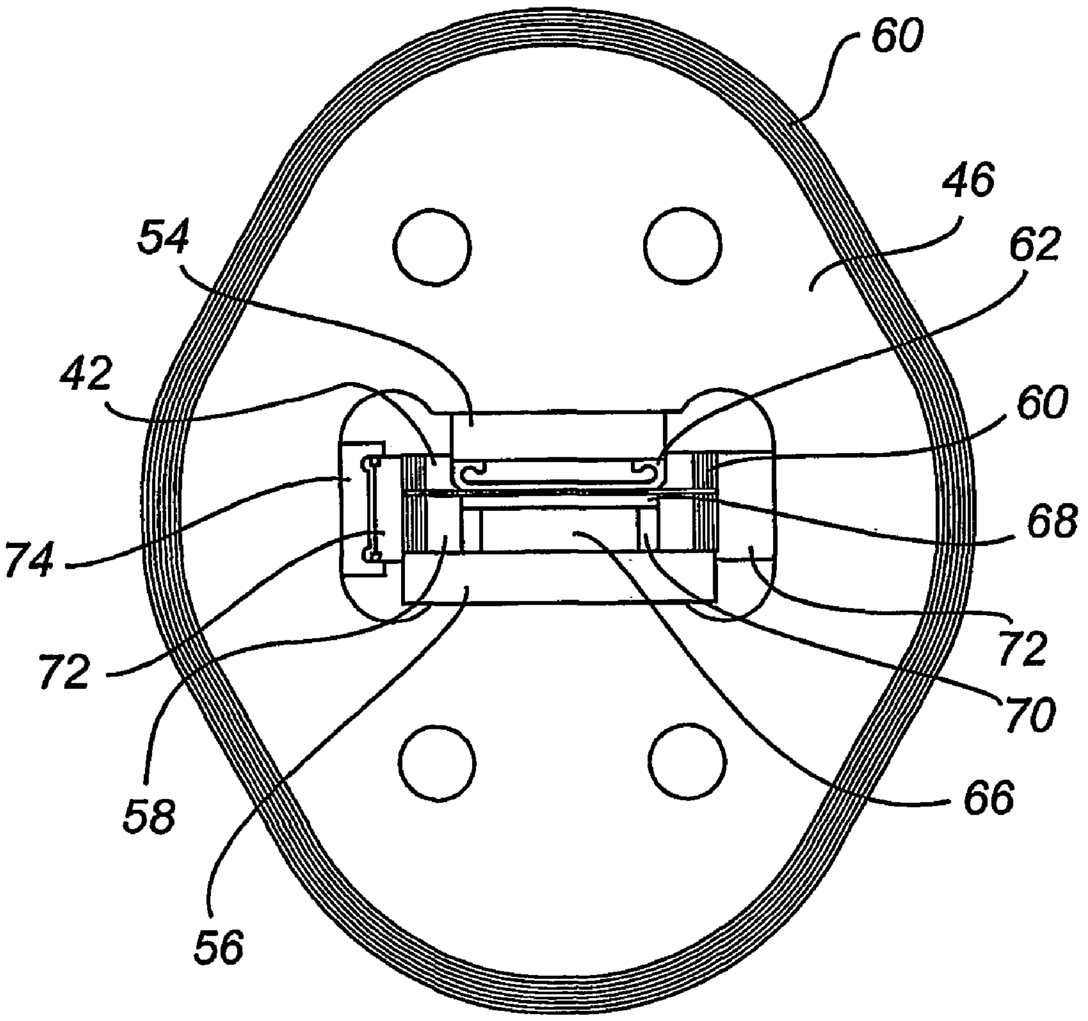
FIG. 4 is a schematic cross-sectional view of the press of pressure cell type along the line B—B in FIG. 3.

FIG. 4 shows the press of pressure cell type in cross-section along the line B—B in FIG. 3. The Figure shows that an external lamellar means 46 is plate-shaped. The central through holes of the lamellar means 46 are defined by an internal edge surface. The hole is essentially quadrangular, but without actual corners. The "corner regions" are instead rounded and bend inwards into the wall so that a larger hole area is obtained. The radii of these inward bends are made relatively large with the aim of minimising the stress concentration that arises in the corner regions.

The external lamellar means 46 is essentially quadrangular and has rounded corners. The shape of the lamellar means 46 is adapted to the expected thrust which arises in connection with the pressing. Thus, the material quantity or the distance between the internal and the external edge surface is larger vertically than horizontally since the main direction of pressing is vertical.

A plurality of turns of a band 60 of spring steel are wound round the external edge surface of the external lamellar means 46, the internal lamellar means 58 and the diaphragm support 42 which are shown in FIG. 4, the band 60 having a width which essentially corresponds to the thickness of the lamellar means 46, 58 and the diaphragm support 42, respectively. The height of the band layer 60 is typically 100 mm. Each band layer 60 can consist of one single long band or a plurality of joined pieces of band. When the lamellar means 46, 58 and the diaphragm support 42 are being manufactured, the band 60 is wound round the same under resistance so that a compressing prestress is permanently induced in the lamellar means 46, 58 and the diaphragm support 42.

FIG. 4 also shows side walls 72 which are ranged on one side each of the internal lamellar means and extend in the direction of the main axis of the press chamber. The side walls 72 have a height which essentially corresponds to the distance between the upper press plate 54 and the bottom plate 56. The diaphragm support 42 and the internal lamellar means 58 are during pressing exposed to an internal overpressure and, because of this fact, the diaphragm support 42 and the lamellar means 58 aim at expanding, whereby high tensile stress is generated in their inner circumference. For this reason, a hydraulic compensator or a generator 74 of horizontal force is arranged adjacent to the left side wall 72 in the Figure. This generator 74 affects the diaphragm support 42 and the internal lamellar means 58 horizontally and predeforms and prestresses the deformation zones thereof. Unlike the integrated wound bands 60, this generator 74 is separate from the diaphragm support 42 and the internal lamellar means 58, and is adapted to apply these radially prestressing or predefoiming forces. Conveniently, the generator 74 comprises hydraulic pistons.

Figure 5:
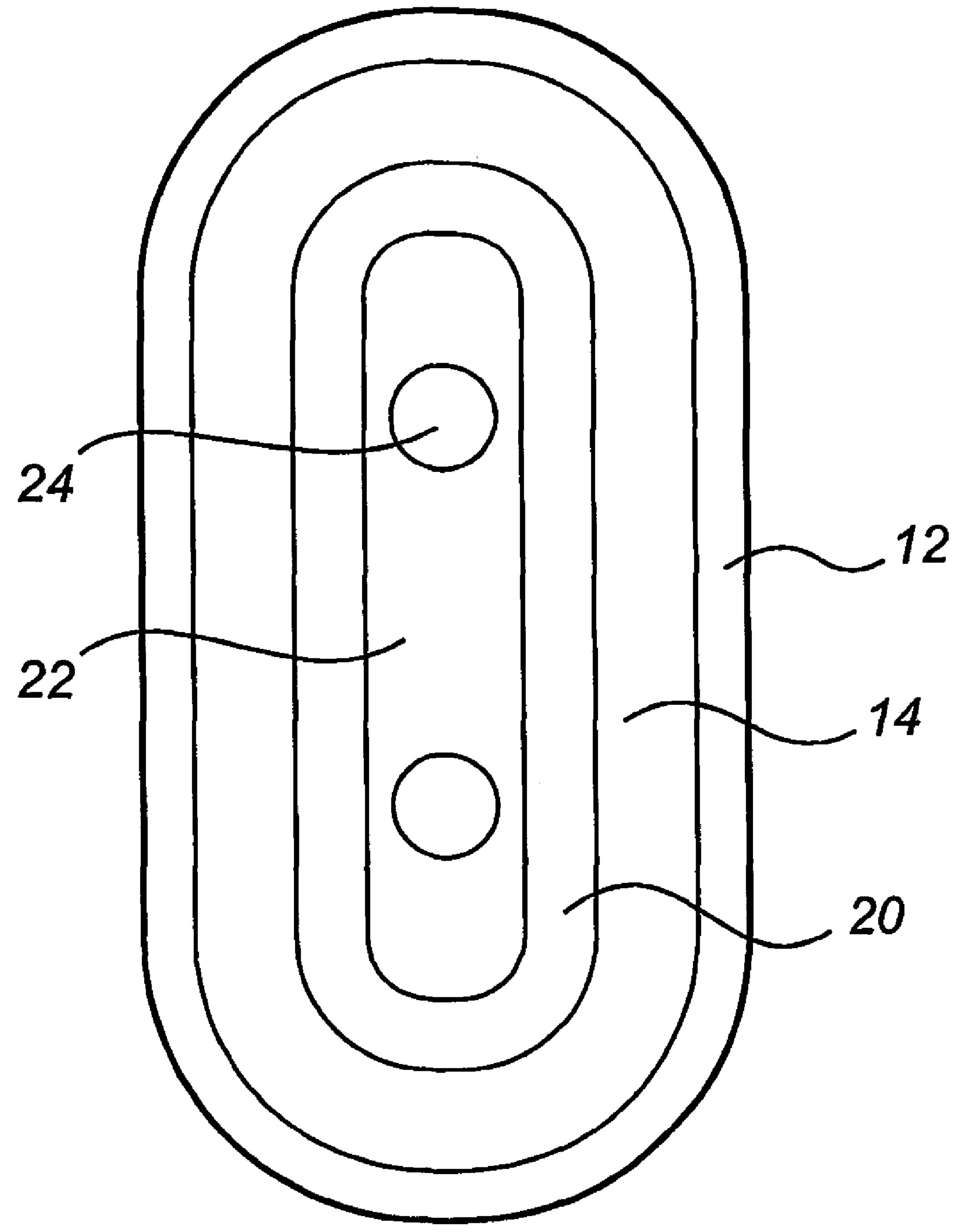
FIG. 5 is a schematic cross-sectional top plan view of the diaphragm device along the line A—A in FIG. 1.

FIG. 5 is a schematic cross-sectional top plan view of the diaphragm device along the line A—A in FIG. 1. FIG. 5 should mainly clearly illustrate the advantageous essentially oval shape (i.e. the shape of a running track) of an embodiment of the diaphragm device and is therefore not really true to scale. The diaphragm support 12 is thus represented in FIG. 5 by the external annular part. Inside this part, the actual diaphragm 14 is located, being a purely coherent sealing element which has no corners. Inside of the diaphragm 14, separating means for stretching of the diaphragm is arranged. Said separating means comprises an external annular frame 20 which is attached to an internal filling plate 22. The filling plate 22 has two holes 24 through which pressure medium can flow into the pressure cell so that the diaphragm 14 expands.

Figure 6A:
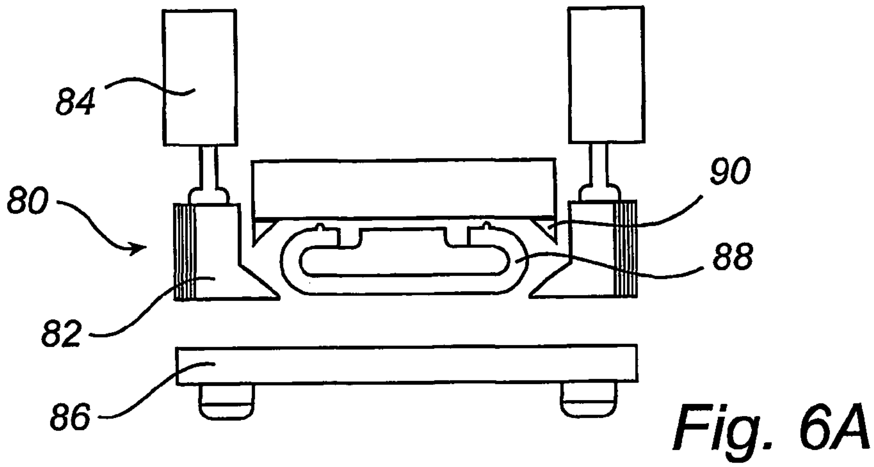
FIGS. 6A–6C schematically illustrates a method for exchanging a diaphragm according to the present invention.
Figure 6B:
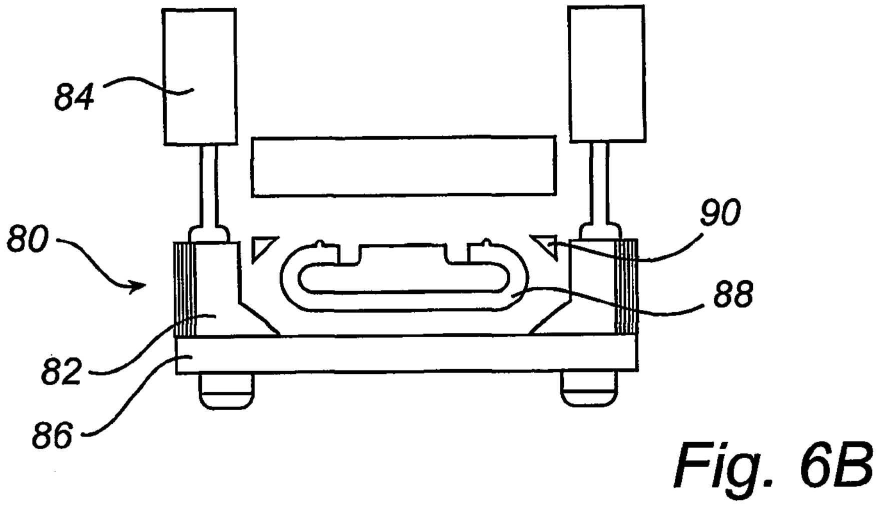
Figure 6C:
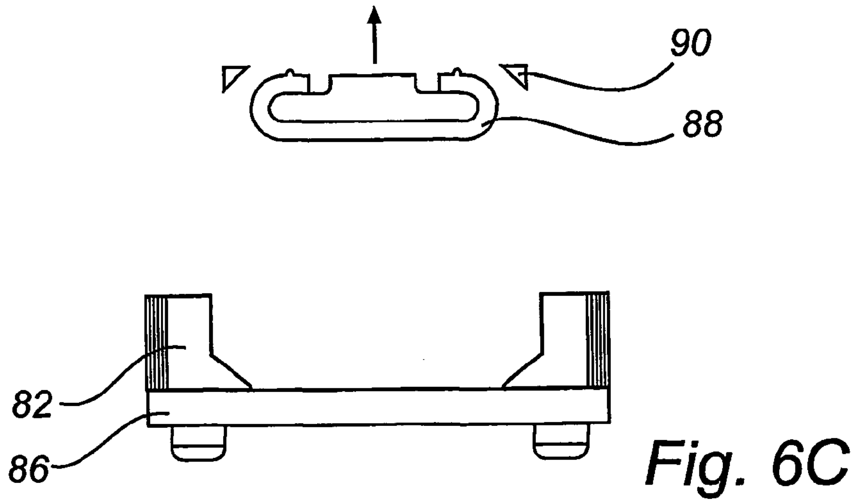

FIGS. 6A–6C illustrate the exchange of a used diaphragm with a new diaphragm according to the invention. In FIG. 6A the diaphragm device 80 according to the invention is shown in an exposed position. This exposed position has been provided by removing the underlying structural support from the press chamber. In order to facilitate the removal of the structural support, the diaphragm device 80 is suitably lifted a distance to eliminate friction between the diaphragm support 82 which is wound with the band and the structural support. The diaphragm device 80 is lifted by means of hydraulic pistons 84 which are arranged on the upper side of the diaphragm support 82. These hydraulic pistons 84 are suitably used also to provide the initial seal that is described in connection with FIG. 2. When the diaphragm device 80 thus has been exposed, a transporting plate 86 is rolled in beneath the diaphragm device 80 in the press chamber. The hydraulic pistons 84 lower the diaphragm device 80 onto the transporting plate 86. Since the weight of the diaphragm 88 and the O-ring gasket 90 can be sufficient to lower the diaphragm support 82, the hydraulic pistons 84 can alternatively regulate the lowering. FIG. 6B illustrates the diaphragm device 80 in a lowered position which has been provided by means of the hydraulic pistons 84. The diaphragm device 80 is now placed on the transporting plate 86 and can be rolled out of the press chamber.

FIG. 6C illustrates that the diaphragm 88 with "contents" and the O-ring gasket 90 located thereabove can easily be lifted out of the diaphragm support 82 when it has been rolled out of the press. This is made possible due to the fact that the diaphragm 88 in a non-pressurised state rests loosely against the shelf portion of the diaphragm support 82. The annular diaphragm support 82 is now ready to receive a new or another diaphragm. The new diaphragm is simply lowered into the diaphragm support 82, after which the entire diaphragm device is inserted into the press chamber and is lifted up to the intended position by means of the hydraulic pistons.

If two diaphragm supports are used in parallel on one transporting plate each, the exchange of diaphragm can take place with minimal interruption of the operation. When the used diaphragm support together with the old diaphragm has been removed from the press chamber, a diaphragm support completed with a new diaphragm is rolled into the press chamber.

The drawings are only intended to clarify the inventive idea and are therefore very schematic. Although some preferred embodiments have been described above, the invention is not limited thereto. It is thus possible to use variants of the internal structure other than those shown. For example, a plurality of internal lamellar means abutting against one another can be used to provide other working depths. Besides, the design of the individual lamellar means and the diaphragm support may be varied in accordance with the current needs. It should thus be understood that a plurality of modifications and variations can be provided without deviating from the scope of the present invention which is defined in the appended claims.

The invention claimed is:

1. A press of pressure cell type, comprising:

a force-absorbing press body;

a press chamber enclosed by the force-absorbing press body;

a diaphragm device arranged in the press chamber, including:

a pressure cell configured to exert a forming pressure on a workpiece in the press chamber, the pressure cell including a diaphragm of resilient material, and a press plate; and an annular diaphragm support in which an edge area of the diaphragm is placed; and actuating means for actively exerting a force on the diaphragm support in the direction of the press plate, the diaphragm support configured to press the edge area of the diaphragm against the press plate while a pressure medium is entering the pressure cell.

2. The press of pressure cell type as claimed in claim 1, wherein the diaphragm device has an insertion position in the press chamber from which the actuating means are adapted to move the diaphragm support towards the press plate in order to provide an initial seal, the diaphragm and the diaphragm support being movable to and from the insertion position as a unit.

3. The press of pressure cell type as claimed in claim 1, wherein the diaphragm support has a planar shape with an external edge surface, and further comprising prestressing means for inducing a compressing prestress acting in a plane of the diaphragm support, the prestressing means arranged on the external edge surface of the diaphragm support.

4. The press of pressure cell type as claimed in claim 3, wherein the prestressing means comprise a prestressing element wound round the diaphragm support.

5. The press of pressure cell type as claimed in claim 4, wherein the prestressing element is band-shaped and has substantially a width which is the same as the thickness of the diaphragm support.

6. The press of pressure cell type as claimed in claim 1, wherein the diaphragm rests on a shelf portion formed in the diaphragm support and is loosely mounted relative to the press plate.

7. The press of pressure cell type as claimed in claim 1, wherein an external edge of the diaphragm is bent upwards and backwards in the circumference, an open space being formed between a diaphragm portion which is not bent upwards and backwards and the edge which is bent upwards and backwards, the edge which is bent upwards and backwards being adapted to provide a seal against the press plate.

8. The press of pressure cell type as claimed in claim 7, wherein the diaphragm comprises an initial sealing bulge which is arranged on the edge being bent upwards and backwards, the initial sealing bulge being adapted to provide the initial seal between the diaphragm and the press plate.

9. The press of pressure cell type as claimed in claim 1, wherein a structural support is arranged in the press chamber below the diaphragm support in such a manner that a gap is formed between the diaphragm support and the structural support when the actuating means affect the diaphragm support so that the initial seal is provided.

10. The press of pressure cell type as claimed in claim 9, wherein the diaphragm is adapted to press the diaphragm support against the structural support when pressure medium is supplied to the pressure cell so that a gap between the diaphragm support and the structural support is eliminated, in a controllable manner, the force acting on the diaphragm support being larger from the diaphragm than from the actuating means.

11. The press of pressure cell type as claimed in claim 9, wherein the structural support comprises a tray which defines a space for arranging a forming tool and a workpiece, and prestressing means, which induce a compressing prestress that acts in planes parallel to a plane of the tray, being arranged on an external surface of the tray.

12. The press of pressure cell type as claimed in claim 11, wherein the tray comprises a number of concentric annular plates which abut against one another and each have a central through hole and extend in planes parallel to the plane of the tray, wherein the holes of the concentric plates mutually form a space in which a workpiece may be machined, uppermost plates exhibiting a contact surface for the diaphragm support.

13. The press of pressure cell type as claimed in claim 12, wherein the plates and the diaphragm support are made of similar sheet-metal blanks.

14. The press of pressure cell type as claimed in claim 1, wherein the actuating means, are also arranged to lower to the insertion position, such as the bottom of the press chamber, and lift therefrom and retain in a position intended therefor, the diaphragm support with a diaphragm resting therein.

15. The press of pressure cell type as claimed in claim 10, further comprising a control device to reduce the actuating means force.

16. A diaphragm device for use in a press of pressure cell type, comprising:

a diaphragm of resilient material, which is adapted to form, together with a press plate, a pressure cell for exerting a forming pressure on a workpiece in the press; and an annular diaphragm support comprising an annular wall portion which is arranged circumferentially and encloses the circumference of the diaphragm, an edge area of the diaphragm being placed in the diaphragm support.

17. The diaphragm device as claimed in claim 16, wherein an inner diameter of the diaphragm support at every given point vertically is at least as large as its inner diameter at a second point located beneath the given point.

18. The diaphragm device as claimed in claim 17, wherein a lower portion of the diaphragm support exhibits a shelf portion in which an edge area of the diaphragm rests, dimensional transitions in the diaphragm support surface of the diaphragm support being bevelled or rounded to avoid sharp contact surfaces against the diaphragm.

19. The diaphragm device as claimed in claim 16, wherein the diaphragm has a substantially oval shape and is devoid of sharp edges.

20. The diaphragm device as claimed in claim 16, wherein the diaphragm support has a substantially oval shape.

21. The diaphragm device as claimed in claim 16, wherein an external edge of the diaphragm is bent upwards and backwards in the circumference, a separating means being arranged between the edge which is bent upwards and backwards and an underlying diaphragm portion, the diaphragm partly enclosing the separating means in such a manner that the diaphragm is kept stretched.

22. The diaphragm device as claimed in claim 21, wherein the separating means comprises a filling plate which is parallel to the press plate and holds the diaphragm stretched, the filling plate being provided with at least one opening for supplying pressure medium to the pressure cell.

23. The diaphragm device as claimed in claim 16, wherein the diaphragm support has a planar shape with an external edge surface, prestressing means, which induce a compressing prestress that acts in a plane of the diaphragm support, being arranged on the external edge surface of the diaphragm support.

24. The diaphragm device as claimed in claim 23, wherein the prestressing means comprise a prestressing element which is wound round the diaphragm support.

25. The diaphragm device as claimed in claim 24, wherein the prestressing element is band-shaped and has substantially the same width as the thickness of the diaphragm support.

* * * * *